E. FREDRIKSEN.
ELECTRIC FLUID HEATING APPARATUS.
APPLICATION FILED JAN. 29, 1920.

1,385,441. Patented July 26, 1921.

INVENTOR
EDWARD FREDRIKSEN,
by Arthur Middleton atty.

UNITED STATES PATENT OFFICE.

EDWARD FREDRIKSEN, OF CHRISTIANIA, NORWAY.

ELECTRIC FLUID-HEATING APPARATUS.

1,385,441. Specification of Letters Patent. Patented July 26, 1921.

Application filed January 29, 1920. Serial No. 354,996.

*To all whom it may concern:*

Be it known that I, EDWARD FREDRIKSEN, citizen of Norway, residing at Christiania, Norway, have invented certain new and useful Improvements in Electric Fluid - Heating Apparatus, of which the following is a specification.

The present invention relates to an electric fluid heating apparatus of the kind at which the fluid perpetually flows through the apparatus. The invention is mainly distinguished by this, that the heating units may be removed from the apparatus without disturbing the connections between this and the inlet and the outlet-tubes, so that it is possible to repair or exchange a heating unit without touching the fluid tubes, which always is of great advantage.

A constructional form of the invention is shown as an example in the accompanying drawing, in which.

Figure 1:
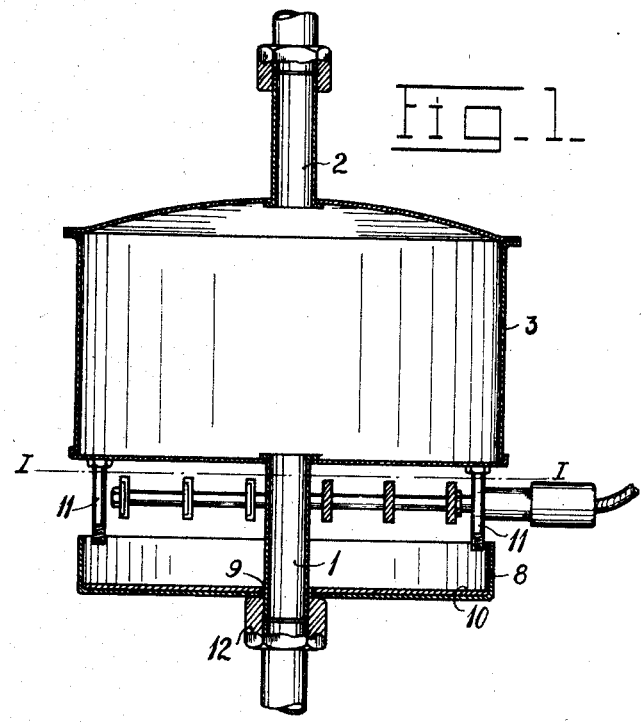
Figure 1 is a vertical section through the apparatus.
Figure 2:
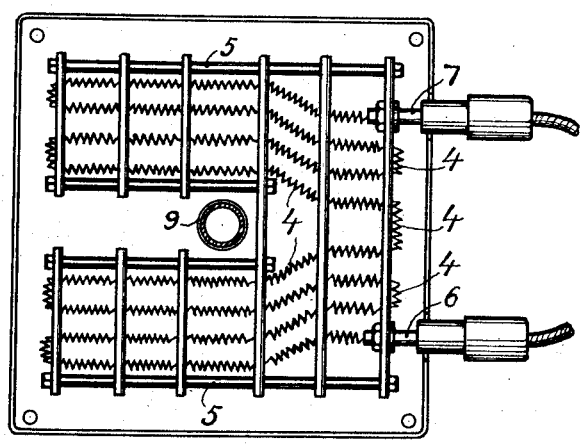
Fig. 2 is a section after the lines I—I in Fig. 1.

—1— and —2— denote the inlet and the outlet-tubes. —3— is a proportionally low container, below which the heating units —4— are arranged. These are as will be seen applied to a special frame —5—, which may be removed from the apparatus without in any way disturbing the fluid tubes or the container. The heating units terminate in pin plugs —6— and —7— or the like, which render it possible that the heating units also may be removed easily from the electric supply wires. Below the heating units are covered by a plate —8— with an aperture —9—, through which the tube —1— may pass freely. The plate —8— is preferably furnished with an inner coating —10— isolating against heat as well as against electricity. As long as the apparatus is fully in order the plate —8— is held closely to the heating units by means of the pins —11—, which protrudes through holes in the plate —8— and are equipped with locking nuts or the like on the under side of the said plate. When it is wanted to take out a heating unit the locking nuts are removed, whereby the plate —8— will drop down upon the nut —12— on the water conduit, so that the frame —5— may be removed easily.

Having now particularly described and ascertained the nature of my said invention and in what manner the same is to be performed, I declare that what I claim is:—

1. In apparatus of the character described, a liquid container, inlet and outlet tubes connected therewith, a removable heating member operatively associated with said container, and a housing for said heating member removably connected to said container.

2. In apparatus of the character described, a liquid container, inlet and outlet tubes connected therewith, a removable heating member operatively associated with said container, and a housing for said heating member removably connected to said container and slidingly mounted upon one of said tubes.

3. In apparatus of the character described, a container, inlet and outlet tubes connected therewith a removable heating member comprising a frame and heating means carried thereby, and means removably connected to said container to house said heating member and to hold said heating member in operative relation to said container.

4. In apparatus of the character described, a liquid container, inlet and outlet tubes connected therewith, a removable heating member adapted to straddle one of said tubes, and means removably connected to said container to hold said heating unit in operative relation to said container.

In testimony whereof I affix my signature.

EDWARD FREDRIKSEN.